United States Patent Office 3,321,247
Patented May 23, 1967

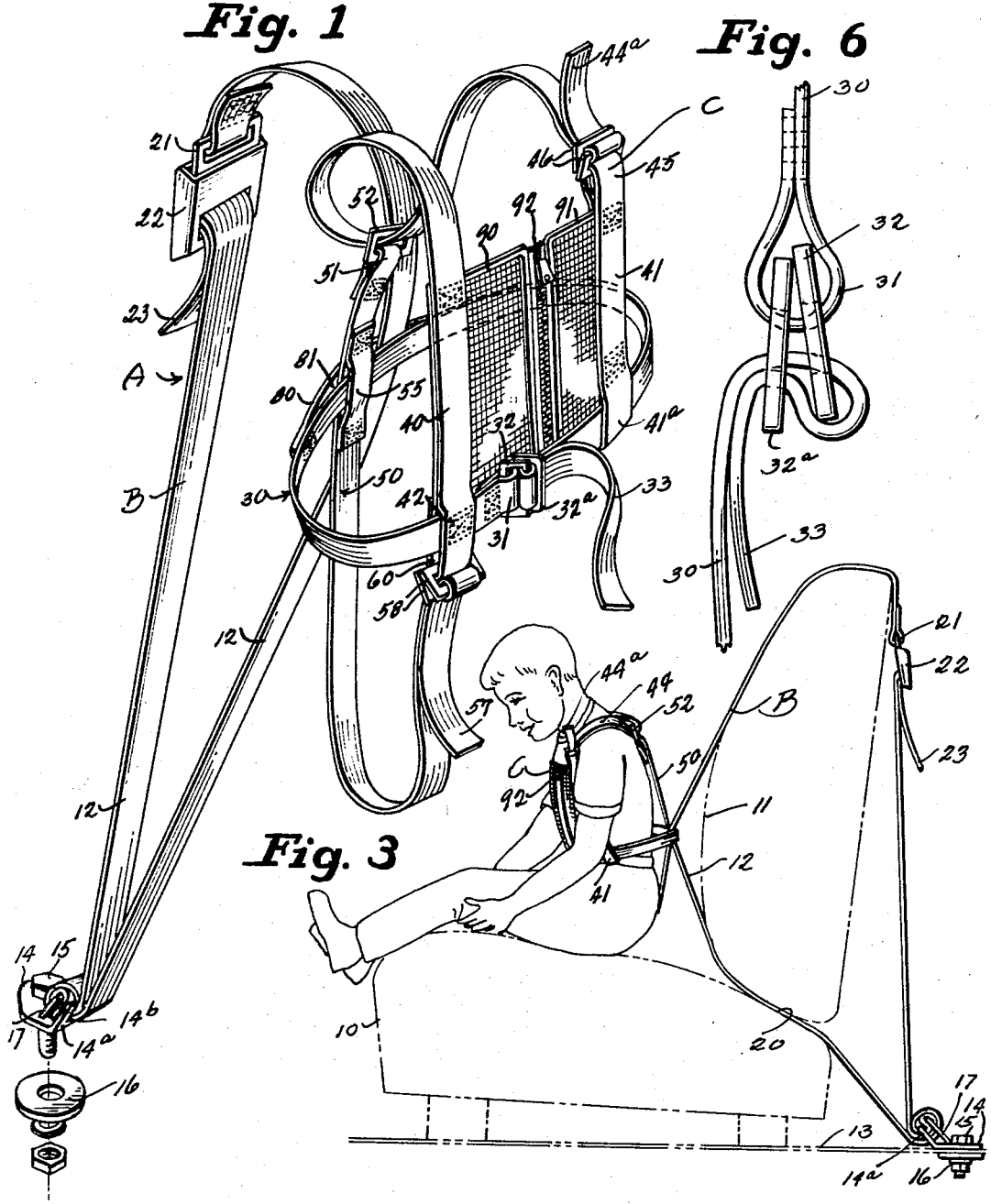

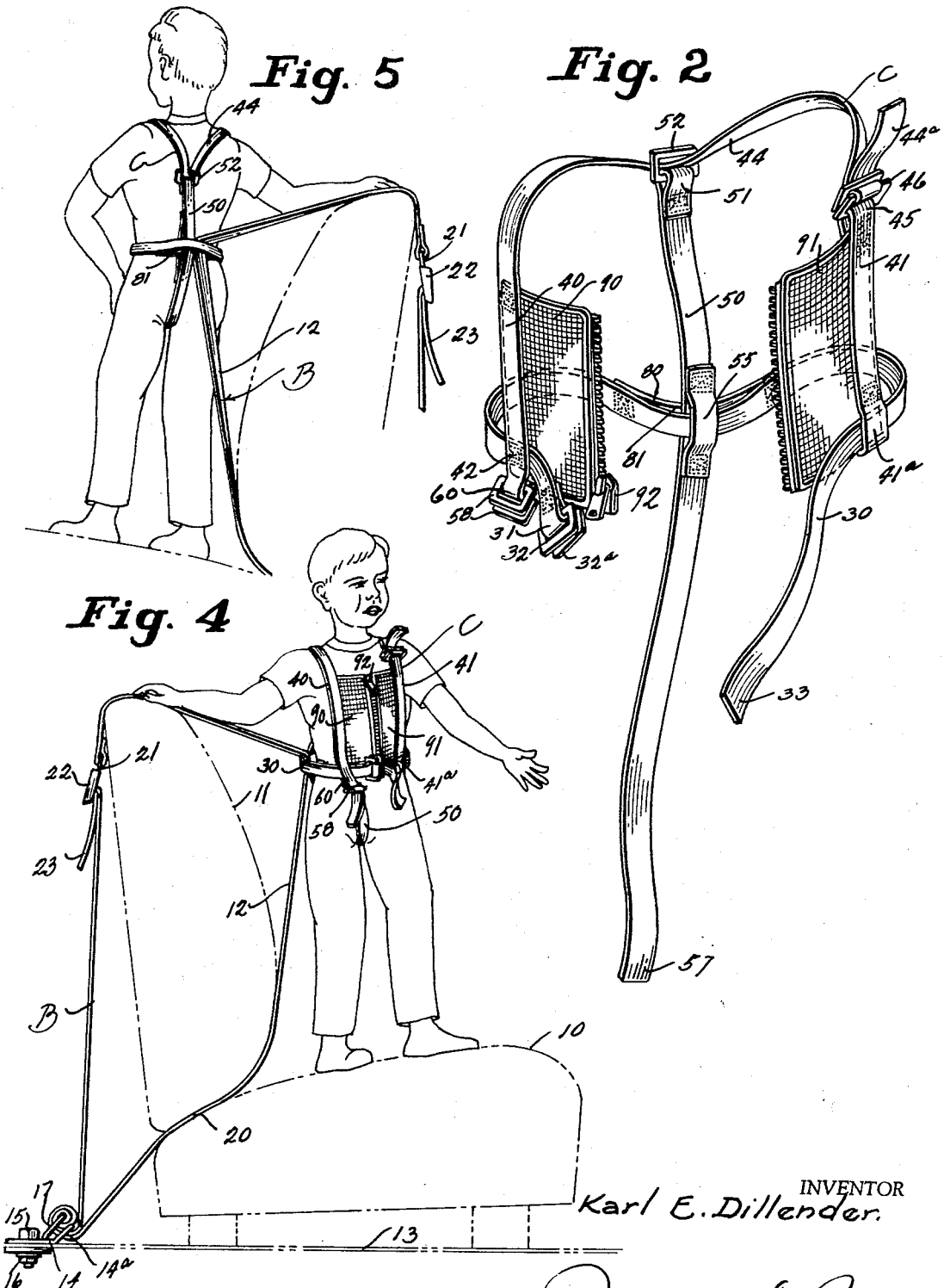

3,321,247
CHILD'S SAFETY HARNESS
Karl E. Dillender, Lexington, Ky., assignor to Irving Air Chute Company, Inc., Lexington, Ky., a corporation of New York
Filed Oct. 11, 1965, Ser. No. 494,672
11 Claims. (Cl. 297—389)

This invention relates to improvements in child's safety harnesses particularly adapted for use in connection with automobiles.

The primary object of this invention is the provision of a child's safety harness adapted to be used in connection with automotive vehicles, which is easy and comfortable of application and which will enable the child to sit in safety upon the automobile seat or stand on the seat with assurance that accidents to the child will be prevented upon quick stoppage of the vehicle.

A further object of this invention is the provision of a child's safety harness which includes restraining means securable to the rear vertical back of an automobile seat and includes a harness or vest so arranged as to enable it to slide along the restraining means so that the child may sit in the seat or rise to a standing position with safety; the improved harness including not only shoulder and waist attaching straps, but also strap means for arrangement between the child's legs.

A further object of this invention is the provision of an improved safety harness for children which includes a novel form of strap connected vest having vented panels.

Other objects and advantages of this invention will be apparent during the course of the following detailed description.

In the accompanying drawings, forming a part of this specification and wherein similar reference characters designate corresponding parts throughout the several views:

FIG. 1 is a perspective view showing the improved child safety harness and details associated therewith.

FIG. 2 is a perspective view of the vest portion of the harness showing its straps and panels in opened position.

FIG. 3 is a side elevation showing the manner in which the child safety harness is applied to the automobile seat back and child while in sitting position.

FIG. 4 is a view showing the child safety harness upon a child standing upon an automobile seat and restrained by an anchor member against injury incident to quick stoppage of the vehicle.

FIG. 5 is a view quite similar to FIG. 4 but showing the rear arrangement of straps upon the seat and child when the child is in standing position upon the car seat.

FIG. 6 is an enlarged view of a conventional ring-type coupling means for adjustably connecting the ends of straps together.

In the drawings, wherein for the purpose of illustration is shown a preferred embodiment of the invention, the letter A may generally designate the child safety harness. It includes an anchor or restraining strap or means B, and a vest type attachable harness C which is adapted to be secured to the child in adjustable connected relation upon the restraining strap means B.

The automobile has a seat which includes a horizontal seat portion 10 and an upright generally vertical back 11.

The anchor or restraining means B preferably comprises a flexible strap 12, of any approved material, such as nylon webbing, which intermediate the ends thereof is secured to the frame 13 of the vehicle by means of a floor bracket 14 secured by a bolt 15 and other hardware 16 to the floor in a manner well known in the art. The bracket 14 includes an upwardly extending plate flange 14ª provided with a slot 14ᵇ through which the intermediate portion of the strap 12 is threaded in doubled relation. An apertured coupling ring 17 is associated with the portion 14ª of the bracket 14, and through it is threaded the doubled portion of the restraining strap 12. The bight of the looped portion of the strap is anchored to the flange 14ª in such manner that the strap at this location may be adjusted for the purpose of securely and adjustably attaching the strap 12 to the floor bracket 14.

The strap 12 is threaded at 20 through the space between the seat 10 and back 11, and the upper end of the front portion is provided with a locking tongue or apertured clip 21 adapted to be detachably received within a latch type buckle 22 of the type generally used on safety belts, so that the strap by means of the end 23 thereof may be adjusted to pull the forward portion of the strap against the front of the seat to the desired looseness or tightness. Such a buckle 22 may be of the type shown in U.S. Patent 3,179,992.

It will be noted that the back portion of the strap 12, behind the seat, is connected to the floor frame at 15 in appreciably spaced relation to the seat 10 and seat back. This enables the seat to be forwardly and rearwardly adjusted, the front portion of the strap 12 being so loosely related that forward movement of the seat back will not result in any injury to the child wearer. The looseness of the front strap portion of the strap 12 permits limited freedom of movement of the child upon the seat cushion.

The vest or body encasing portion C of the child's harness preferably comprises a waist band or strap portion 30 of flexible webbing, one end of which has a fixed loop 31 supporting rings 32 and 32ª of a conventional slip coupling. The opposite end of the waist band 30 is adapted to be doubled upon itself and slipped through coupling ring 32ª which at the bight end is slipped through the opening of the coupling member 32 in a manner well known to those skilled in the art; the free end 33 at the waist band being the adjusting end.

The child's harness furthermore includes front flexible upright straps or webs 40 and 41, the former of which is stitched at 42 to the waist band 30 adjacent to but spaced from the coupling member 32. The lower end of strap 41 is looped at 41ª and slidable along the waist strap 30. The front strap portions 40 and 41 extend upwardly. The portion 40 is continuously extended over the right shoulder and across the back at 44 and connected at the left shoulder portion to the upper looped portion 45 of the strap 41 by means of an adjustment coupling 46 comprising a pair of the adjusting coupling rings such as shown at 32 and 32ª. The end 44ª of strap 44 may be adjusted through the coupling rings 46 for the purpose of varying the length of the upper crossed portion of the shoulder strape at the back of the wearer.

A combination back and crotch strap or web 50 is provided at its upper rear portion with a loop 51 which holds an apertured connector ring 52 through the opening of which the cross strap portion 44 is slidably threaded between the shoulder straps. The strap 50 where it passes the strap 30 is provided with a loop 55 slidably enclosing the rear of the waist band for lateral adjustment thereon. On the crotch strap 50 is a free end 57 and it is adapted to be adjustably connected to a ring-type coupling 58 composed of two rings, such as the rings 32 and 32ª above described, both of which are threaded through the lower looped end 60 of the front strap 40. The rings receive the end 57 for adjustment purposes in a manner well understood in the art. Thus, the strap 50 forms a back and also a leg or crotch loop for adjustment between the legs of the wearer. Pulling on the strap end 57 adjust the strap 50 to the stature of the wearer.

A loop providing strap member 80 is secured on the rear of the waist band 30 providing a very lengthy opening 81 adapted to receive the strap 50 therethorugh, as shown in FIG. 1, and also the front upright portion 12 of the retaining strap 12 in a slidable relation thereon.

The front straps 40 and 41 are quite widely spaced and secured to the rear thereof are panels 90 and 91 formed of marginally bound perforate nylon netting. These panels 90 and 91 lie between the straps 40 and 41 and they are secured together at their proximate margins by means of a slide fastener 92 which opens at the waist belt as shown in FIG. 2.

It will be noted that the child can be comfortably and safely connected to the seat and to the frame of the car by the restraining member 12. The child may move laterally even though the front portion of the restraining strap 12 is held taut by the child, and the vest portion may slide upwardly and downwardly on this front portion of the retaining or anchor strap.

It will be apparent from the foregoing that the shoulder straps are self-adjustably connected to the main anchor back strap and the latter is attached in the vicinity of the pelvic area to the child's waistband. The vest holds all of these parts in proper position upon the child.

Various changes in the size, shape and arrangement of parts may be made to the form of invention herein shown and described without departing from the spirit of the invention or scope of the claims.

I claim:

1. A child's safety harness adapted to be used in a vehicle having a generally vertically disposed seat back, comprising an upright flexible restraining anchor strap adapted to be mounted on the seat structure so as to provide a strap portion lying at the front of the seat back, a flexible waist strap slidably mounted on the restraining strap for adjustable movement in an upright and downright direction and for lateral adjustment with respect thereto, an adjustable coupling means for the waist strap whereby to vary the size thereof, right and left flexible front straps secured to the waist strap at each side of the coupling means terminating at their upper ends in shoulder straps and having strap means connected thereto which is adjustably secured for lateral adjustment to the waist strap upon the rearward portion of the waist strap, a crotch strap secured to the rear of the waist strap and adapted to extend between the legs of the wearer and upwardly in front of the wearer, and coupling means for adjustably and detachably connecting said crotch strap to the front of the harness.

2. A child's safety harness as described in claim 1 in which the strap means connected to the upper ends of the shoulder straps extends across the upper back of the child and the back strap extends upwardly above its adjustable connection with the waist strap and has an adjustable lateral sliding connection with said cross strap portion between the shoulder straps.

3. A child's safety harness as described in claim 1 in which vented panels of flexible material are secured to each of the front straps extending into the area between the front straps and having a slide connector detachably connecting the panels together at their proximate margins.

4. In combination with an automobile seat, including a seat portion and an upright back portion, a flexible restraining strap located upon the back portion of the seat and extending upwardly with means to adjust the length thereof, and a child's vest including a waist strap having means at the rear thereof for slidable connection laterally and in an up-and-down direction upon said front portion of the restraining strap, shoulder strap means having length adjustable connections with said waist strap, a crotch strap having a laterally movable, adjustable connection with said waist strap, and an adjustable connector on the front of the harness for said crotch strap.

5. In a child's safety harness the combination of a flexible waist strap having coupling means at the front thereof for adjustably connecting the ends of the same together, upright spaced front straps connected upon said waist strap, front closure panels of flexible material connected to the front straps and extending in proximate relation between the front straps, means for detachably connecting said closure panels together, laterally extending shoulder strap means connected to the upper ends of said front straps and having strap means slidably connected for lateral movement upon said waist strap.

6. A child's harness as described in claim 5 in which a medial back strap is slidably connected to the shoulder straps between the front straps at the rear of the wearer and is adjustably connected to the waist strap at the rear of the waist strap for lateral sliding movement.

7. A safety harness as described in claim 6 in which the medial back strap has continuous therewith a crotch strap extending downwardly and adapted to extend between the legs of the wearer, and means for detachably coupling the free end of said crotch strap to the lower end of one of the front straps.

8. In a child's safety harness the combination of a waist strap, means for connecting the ends of the waist strap at the front of the wearer for girth adjustment of the waist strap, upright front straps connected to the waist strap at the right and left, the waist strap having a lengthwise adjustable connection with at least one of said upright front straps, shoulder straps having a cross strap portion adapted to be positioned at the rear upper portion of the wearer and connecting the rear ends of said shoulder straps together, means to adjust the length of said cross strap portion in relation to its connection with the front straps, a medial back strap having a longitudinal slidable connection upon the cross strap portion and a longitudinally slidable connection upon the waist strap, a crotch strap connected with the lower end of the medial back strap, buckle means to adjustably connect the front lower portion of the crotch strap with the lower end of one of said front straps, a vest comprising a pair of panels, one of each being connected to the proximate margins of the front straps and extending toward each other, and slide fastener means connecting the panels together at their proximate margins.

9. In a child's safety harness a flexible waist strap having vest means to adjustably connect the same together at the front of the wearer, upright straps connected to the waist straps at the front of the wearer and extending upwardly and having a cross shoulder and back extension connecting the upper ends thereof with means to adjust the length of said cross shoulder and back extension, a back and crotch strap flexibly connected to the waist strap and a cross back extension for lateral adjustment therealong, and means for connecting the crotch strap at its lower front end to the waist strap.

10. In a child's safety harness, a flexible waist strap having vest means to adjustably connect the same together at the front of the wearer, upright straps connecting the waist strap at the front of the wearer and extending upwardly and having a cross shoulder and back extension connecting the upper ends of said upright straps with means to adjust the length of said cross shoulder and back extension, the front straps having flexible panels connected thereto extending towards each other, and means to detachably connect said flexible panels together at their proximate margins.

11. In a child's safety harness a flexible waist strap having vest means to adjustably connect the same together at the front of the wearer, upright straps connected to the waist strap at the front of the wearer and extending upwardly and having a cross shoulder and back extension connecting the upper ends of said upright straps with means to adjust the length of said cross shoulder and back extension, the front straps being provided at their upright proximate edges with inwardly extending vented panels, and slide fastener means for detachably connecting the proximate margins of said panels together at the median front of the wearer.

References Cited by the Examiner

UNITED STATES PATENTS

| | | | |
|---|---|---|---|
| 1,048,033 | 12/1912 | Brown | 128—134 |
| 1,310,958 | 7/1919 | O'Connor | 128—134 |
| 1,573,446 | 2/1926 | Popham | 128—134 |
| 2,535,683 | 12/1950 | Kimball | 182—3 X |
| 2,877,833 | 3/1959 | Boles | 182—3 X |
| 2,888,063 | 5/1959 | Rose | 280—150 |
| 2,940,443 | 6/1960 | Baker | 297—384 |
| 3,034,596 | 5/1962 | Twaits | 182—3 |

FOREIGN PATENTS 97,633   3/1961   Norway.

DAVID J. WILLIAMOWSKY, *Primary Examiner.*

JAMES T. McCALL, *Examiner.*